United States Patent
Karakop et al.

(10) Patent No.: US 10,915,892 B2
(45) Date of Patent: Feb. 9, 2021

(54) SAFE CARD

(71) Applicants: Rahamim Karakop, Nazareth Elite (IL); Nir Zerwal, Afula (IL)

(72) Inventors: Rahamim Karakop, Nazareth Elite (IL); Amit Cohen, Nazareth Elite (IL)

(73) Assignees: Rahamim Karakop, Nazareth Ellit (IL); Nir Zerwal, Afula (IL)

( * ) Notice: Subject to any disclaimer, the term of this patent is extended or adjusted under 35 U.S.C. 154(b) by 511 days.

(21) Appl. No.: 14/382,332

(22) PCT Filed: Jan. 30, 2013

(86) PCT No.: PCT/IL2013/050084
§ 371 (c)(1),
(2) Date: Sep. 1, 2014

(87) PCT Pub. No.: WO2013/114364
PCT Pub. Date: Aug. 8, 2013

(65) Prior Publication Data
US 2015/0332257 A1    Nov. 19, 2015

(30) Foreign Application Priority Data
Jan. 30, 2012    (IL) .......................... 217834

(51) Int. Cl.
*G06Q 20/38*        (2012.01)
*G06Q 20/34*        (2012.01)
(Continued)

(52) U.S. Cl.
CPC ......... *G06Q 20/382* (2013.01); *G06Q 20/341* (2013.01); *G06Q 20/356* (2013.01);
(Continued)

(58) Field of Classification Search
CPC .. G06Q 20/382; G06Q 20/341; G06Q 20/356; G06Q 20/385; G06Q 20/40145; G06Q 20/409; G07F 7/10
See application file for complete search history.

(56) References Cited

U.S. PATENT DOCUMENTS 5,163,098 A * 11/1992 Dahbura ................. G06Q 20/04
                                                                705/75
5,550,358 A *  8/1996 Tait ........................ G06Q 20/04
                                                                235/375
(Continued)

*Primary Examiner* — Thomas D Alunkal
(74) *Attorney, Agent, or Firm* — William Dippert; Laurence Greenberg; Werner Stemer

(57) ABSTRACT

A safe card system comprising: a plurality of safe cards, at least one safe card reader and a service provider computer. Each safe card: Capable of generating at a specific time a temporary number based on combination of a first number representing at least one biometric identifier, and a temporary second number, and a card signal based on the temporary number; The at least one safe card reader capable of reading the card signal, and converting the card signal into a card reader number, The service provider: Capable of drawing at a specific time at least one fifth number associated with said time, generating at least one sixth number derived from the fifth numbers, and comparing the sixth numbers to the card reader number so as to allow service to the safe card when a sixth number is identical to the card reader number.

18 Claims, 2 Drawing Sheets

(51) Int. Cl.
*G06Q 20/40* (2012.01)
*G07F 7/10* (2006.01)
(52) U.S. Cl.
CPC ......... *G06Q 20/385* (2013.01); *G06Q 20/409* (2013.01); *G06Q 20/40145* (2013.01); *G07F 7/10* (2013.01)

(56) References Cited

U.S. PATENT DOCUMENTS

| | | | |
|---|---|---|---|
| 2002/0153424 A1* | 10/2002 | Li | G06K 19/06206 235/492 |
| 2002/0180584 A1* | 12/2002 | McGregor | G06Q 20/341 340/5.26 |
| 2006/0278698 A1* | 12/2006 | Lovett | G06Q 20/24 235/380 |
| 2008/0210754 A1* | 9/2008 | Lovett | G06Q 20/24 235/380 |

* cited by examiner

SAFE CARD

CROSS REFERENCE TO RELATED APPLICATIONS

This patent application is a U.S. National Phase filing of commonly owned PCT Application No. PCT/IL2013/050084, filed Jan. 30, 2013, which is based on and claims the benefit of the filing date of Israeli Patent Application Serial No. 217834, filed Jan. 30, 2012, both which are incorporated herein by reference in their entirely.

FIELD OF THE INVENTION

The present invention relates to smart cards.

BACKGROUND OF THE INVENTION

This invention relates to credit cards. More particularly, this invention relates to systems and methods for protecting against credit card fraud and abuse.

Billions of dollars are lost annually to credit card fraud. Particularly, credit card numbers are copied and used without permission, for example by theft of the credit card, and unlawful copying by a salesperson. Copying may take many forms. A thief may, for example, catch a glimpse of an actual credit card and copy the number by writing the number on a piece of paper. Alternatively, a thief may intercept a digital signal representative of the credit card number and utilize such a digital signal at a later time. It is therefore desirable to provide systems and methods that completely eliminate the possibility for such types of credit card fraud.

Traditional credit cards that employ magnetic stripes are deficient because the magnetic stripe is highly susceptible to wear and magnetic interference. Particularly, the magnetic stripe can be worn down physically or rewritten/erased by magnetic interference. It is therefore desirable to provide a robust credit card that can withstand wear and is not susceptible to interference. Furthermore, the magnetic stripe still ultimately provides data that might be intercepted and abused.

One objective is to provide a smart card that generates credit card numbers that are exceedingly difficult to intercept. Another objective is to provide a smart card wherein intercepted credit card numbers change too fast to allow abuse of the card.

SUMMARY OF THE INVENTION

According to one aspect, a safe card is provided, comprising:
at least one card sensor capable of generating at least one card input signal representing at least one biometric identifier;
a card input converter configured to convert the at least one card input signal into a first number;
a card microprocessor;
a clock;
at least one card computer memory comprising:
a preprogrammed card lookup table of second numbers, wherein each of the second numbers is uniquely associated with a specific time of the clock;
preprogrammed instructions for the card microprocessor to automatically generate, at a specific time of the clock, a third number comprising a combination of the first number and one of the second numbers associated with the specific time of the clock, and
a card signal output means configured to convert the third number into at least one card output signal representing the third number.

Said at least one card computer memory may be ROM.

The card output signal may comprise a barcode and/or QR.

In some embodiments the card output signal means exclude alphanumeric character displayers and USBs.

The excluded alphanumeric character displayers are for example digital display screens and printers.

Alternatively, the card signal output means is selected from a group comprising at least one display screen, a printer, USB, and combinations thereof.

At least one card computer memory may further comprise at least one lookup table of arrays, each array comprises a set of rearrangement parameters uniquely associated with a time of the clock, and wherein the preprogrammed instructions further comprise instructions to automatically rearrange the digits in the first number at the specific time according to the a set of rearrangement parameters associated with the specific time.

Said at least one card computer memory may further comprise a lookup table of arrays with operand parameters, each operand parameters array being uniquely associated with a time of the clock, and wherein the preprogrammed instructions further comprise instructions to automatically calculate the third number based on an operated number generated by operations on the second number with the operand parameters of an operand parameters array associated with the specific time.

Said at least one card computer memory may further comprise a lookup table of arrays, each array comprises a set of rearrangement parameters uniquely associated with a time of the clock, and wherein the preprogrammed instructions further comprise instructions to automatically rearrange the digits in the operated number to a rearranged operated number at the specific time according to the a set of rearrangement parameters associated with the specific time.

The biometric identifier may be selected from for example voice, retina pattern, PIN number, fingerprint, handprint, facial features, and combinations thereof.

Some embodiments further comprise a keypad.

In some embodiments the card signal output means comprises a screen, wherein the screen comprises a series of display cells, each cell configured to display one digit of a decimal base of the third number, and wherein:
the card computer memory further comprises a lookup table of arrays, each array with a set of rearrangement parameters, uniquely associated with a time of the clock, and
the preprogrammed instructions further comprise instructions to:
automatically remove digits from the second number in decimal base, at the specific time, according to a set of rearrangement parameters associated with the specific time;
output digits remaining in the second number after the removal to display cells according to the position of the digits in the second number decimal base;
replace removed digits in the second number decimal base with digits of the first number,
wherein the third number is the second number decimal base with removed digits thereof replaced with the digits of the first number.

In some embodiments wherein the card signal output means comprises a screen, and wherein the screen comprises a series of display cells, each cell configured to display one digit of a decimal base of the third number:
  the card computer memory further comprises a lookup table of arrays, each array with a set of rearrangement parameters, uniquely associated with a time of the clock, and
  the preprogrammed instructions further comprise instructions to:
    automatically remove digits from the operated number;
    output digits remaining in the operated number after the removal to display cells according to the position of the digits in the operated number decimal base;
    replace removed digits in the operated number decimal base with digits of the first number,
  wherein the third number is the operated number decimal base with removed digits thereof replaced with the digits of the first number.
In some embodiments wherein the card signal output means comprises a screen, and wherein the screen comprises a series of display cells, each cell configured to display one digit of a decimal base of the third number:
  the card computer memory further comprises a lookup table of arrays, each array with a set of rearrangement parameters, uniquely associated with a time of the clock, and
  the preprogrammed instructions further comprise instructions to:
    automatically remove digits from the rearranged operated number;
    output digits remaining in the rearranged operated number after the removal to display cells according to the position of the digits in the rearranged operated number decimal base;
    replace removed digits in the rearranged operated number decimal base with digits of the first number,
    wherein the third number is the rearranged operated number decimal base with removed digits thereof replaced with the digits of the first number.

Some embodiments further comprise batteries operationally coupled to the processor. Some embodiments further comprise a housing wherein the housing is selected from the housing of a credit card, a smart card, a computer, a cellular telephone and a PDA.

Some embodiments further comprise a PIN code in said at least one computer memory, wherein said PIN code represents one biometric identifier, and the card is configured to allow use thereof when the first number matches the PIN code.

Preferably the processor and memory are part of a microcontroller.

Preferably, the third number of each safe card at the specific time is different from the third number at said specific time of another safe card from said plurality of safe cards.

According to another aspect, a safe card system is provided comprising:
  a plurality of safe cards, each safe card comprises:
    at least one card sensor capable of generating at least one card input signal representing at least one biometric identifier;
    a card input converter configured to convert the at least one card input signal into a first number;
    a card microprocessor;
    a first clock;
    at least one card computer memory comprising:
      a preprogrammed card lookup table of second numbers, wherein each of the second numbers is uniquely associated with a specific time of the first clock;
      preprogrammed instructions for the card microprocessor to automatically generate, at a specific time of the first clock, a third number comprising a combination of the first number and one of the second numbers associated with the specific time of the first clock;
      a card signal output configured to convert the third number into at least one card output signal representing the third number;
  at least one safe card reader comprising
    at least one card reader sensor capable of reading the card output signal;
    a card reader input converter configured to convert the at least one safe card reader input signal into a fourth number,
  a service provider computer comprising:
    a second clock;
    a service provider microprocessor;
    at least one service provider computer memory comprising:
      preprogrammed service provider lookup tables of fifth numbers, wherein each fifth number in the service provider tables is associated with a time of the second clock;
      preprogrammed instructions for the service provider microprocessor capable of automatically generate at the specific time at least one sixth number derived from the fifth numbers associated with the specific time, and compare the sixth numbers to the fourth numbers so as to allow service to the safe card generating the third number when a sixth number is identical to the fourth number.

In some embodiments each of said at least one safe card readers further comprise a GPS configured to assign a seventh number unique to a location of the safe card reader, and wherein the input converter is configured to combine the seventh number with an eighth number assigned to the card reader input signal, so as to generate the fourth number.

In some embodiments said at least one card reader sensor is a barcode or QR reader.

In some embodiments said at least one safe card reader is housed within a card reader housing.

Some embodiments further comprise communication means configured to allow the first clock and the second clock to synchronize their times.

Some embodiments further comprise a GPS configured to assign a seventh number unique to the location of the safe card, and wherein the preprogrammed instructions further comprise to combine the first number, the second numbers and the seventh number, to generate the third number.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
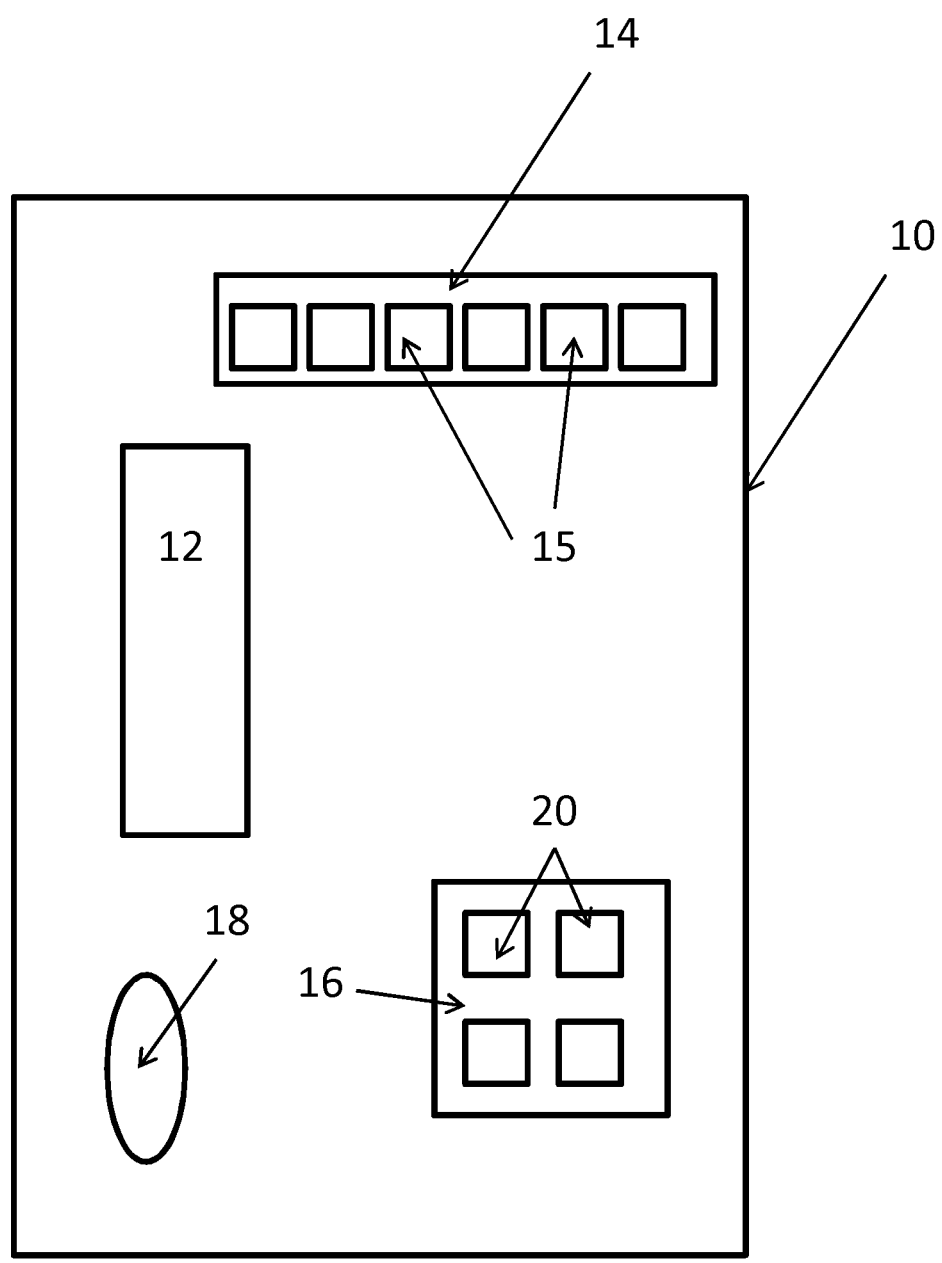
FIG. 1 depicts a safe card embodiment.

FIG. 1 schematically depicts some features of one embodiment of a safe card 100. The safe card 100 is for example an improved credit card.

Each card 10 is individually dispensed to a user. The card 10 comprises a computer 12 (processor and memory that can be incorporated together or not) that processes data pertaining to biometric identifiers of the user, as well as other data singular to the card at any selected time, as will further be explained below. The embodiment 10 further comprises a digital display 14 as output means and a keypad 16 as input means for manual entrance of personal secret identification number (PIN), as an example. The input keys 20 can be represented by numbers, alphabetical or any other representation. The card 10 further comprises a battery 18. The display 14 is actually composed of a number of cells 15 that are each configured to display one digit of a number related to the PIN and/or a biometric identifying feature of the user, as well as another number related to or derived from the aforementioned singular data stored in the card 10.

Figure 2:
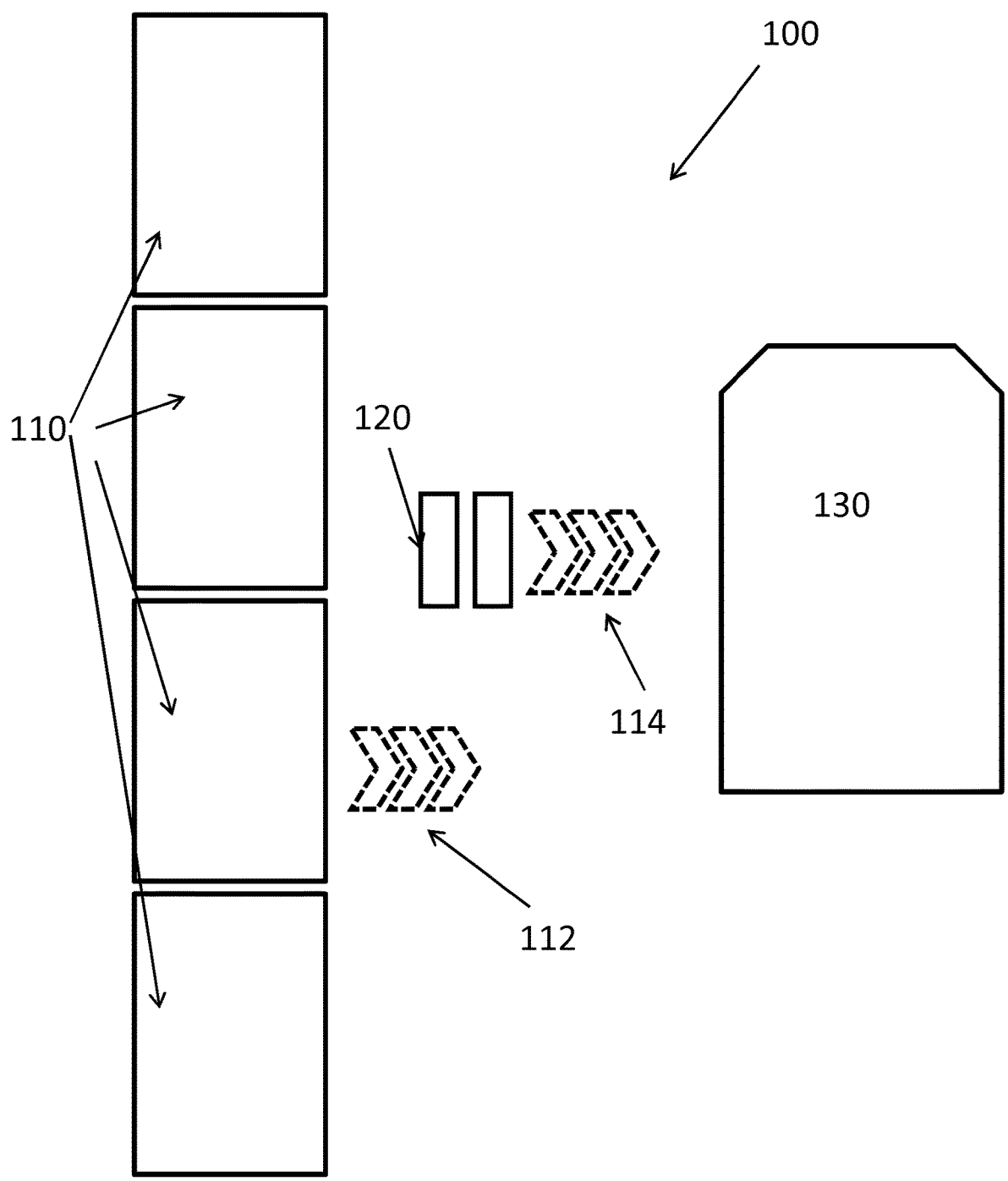
FIG. 2 depicts a system for operating a safe card.

FIG. 2 schematically illustrates a system 100 that comprises multiple safe cards 110 available for different users, as well as safe card readers 120 and a service provider computer system 130. The safe cards 110 actively or passively convey a signal 112 representing the combined secret data and biometric identifier of the user to a safe card reader 120, for example a barcode and/or QR reader in a shop or a reader of an ATM machine, and the safe card reader 120 conveys its own signal 114 to the service provider system 130 that has stored data that is matched with the data received therein to decide whether to authorize service to the user or not. The information of the safe card can be conveyed to the card reader digitally or analogically through a signal or by manual operation through a computer by which the user inputs the information to the system. Any card reader using any technology can be used without limiting the scope of the present invention.

Typically, the service provider manufactures the safe card and installs at least some data into the memory as well; the service provider data, however, may be data that is installed in all of the manufactured safe cards and is not singular to a given card but rather is the same in all of the cards at that time. Such data may be the base for operations performed on the singular data. The singular data may be installed by another system, thereby allowing the service provider (such as a card wiring system of a credit card company) to quickly manufacture the cards without major changes to the production process compared to manufacture of commercially available cards.

According to one aspect, a plurality of safe cards is provided.

Each safe card comprises:
a card housing;
at least one card sensor on the card housing, the card sensor capable of generating at least one card input signal representing at least one biometric identifier of a user;
a card input converter in the card housing, the card converter configured to convert the at least one card input signal into a first number;
a card microprocessor in the card housing;
a first clock;
at least one card computer memory in the card housing, the card computer memory comprising:
a preprogrammed card lookup table of numbers, wherein each time of the first clock is uniquely associated with a second number derived from the card table of numbers;
preprogrammed instructions for the card microprocessor to automatically: generate, at a specific time of the first clock, a third number comprising a combination of the first number and a second number associated with the specific time, each safe card having a third number at the specific time that is different from other safe cards in the plurality of safe cards;
card signal output means on the card housing, the card signal output means configured to convert the third number into at least one card output signal representing the third number.

The card housing is preferably the credit card plastic, a cell-phone or any other housing that incorporates the components of the safe card.

The card may be used for access to personal bank account, drawing money out of an ATM, unlocking a computer, PDA, cellular phone, door, appliance, industrial process system, vehicle, virtual or real social systems or organizations, for example.

The plurality of safe cards are operated with a system that further comprises
safe card readers, each comprising:
a card reader housing;
at least one card reader sensor on the card reader housing, the card reader sensor capable of reading the card output signal;
a card reader input converter in the card housing, the card reader input converter configured to convert the at least one card reader input signal into a fourth number, and
a service provider computer system comprising:
a second clock;
a service provider microprocessor;
at least one service provider computer memory comprising:
preprogrammed service provider lookup tables of fifth numbers, wherein each fifth number in the service provider tables is associated with a time of the second clock;
preprogrammed instructions for the service provider microprocessor to automatically: at the specific time generate at least one sixth number derived from the fifth numbers associated with the specific time, and compare the sixth numbers to the fourth number,
so as to allow service to the user when a sixth number is identical to the fourth number.

Numbers generated for output in each safe card are unique to the same safe card, relative to all the other safe cards interactive with the service provider computer system, at any given time. Typically, these unique numbers have been carefully matched with a store of numbers in the service provider computer system, before the cards were manufactured, so that at any time the user uses the safe card, there is a match between the unique generated numbers of the card and one of the numbers generated by the service provider computer system at the same time.

The term "time" is to be broadly construed as relating to either a specific time or a period of time such as 5 minutes. The time may also be relative to a reference time, for example the time of the manufacture of the cards. The clocks may be the respective processor of the card and/or the service provider computer system.

Typically, the service provider computer system generates tables of numbers for all of the safe cards at any given time; alternatively, data identifying the user may be conveyed to the service provider computer system, that triggers generating a sixth number for the user that should match the fourth number.

After said given time, the third numbers change. Typically, second numbers are sequentially drawn from the tables in the memory of the card. A similar or identical process may occur in the service provider computer system, i.e. a number ascribed to the user may be combined with a PIN of the user and the resultant combination compared to the number provided by the card or the card reader.

Note that whereas typically the service provider computer system has stored therein a PIN of the user, or at least the numbers stored therein contain digits of the PIN, the cards may not store therein the PINs, so that the cards cannot be used without the user providing the PIN or a biometric identifier to the card. Such cards may not include a keypad. However, in some cards the PIN may be stored; in which case the card is typically locked until the user manually enters the PIN to the card.

It will occur that despite the uniqueness of the numbers generated in each card, two cards or more might simultaneously generate the same third number by the card. This quandary may be solved by the service provider computer system or other system carefully checking all existent and functional cards, at all of the programmed times, to ensure there is no duplicity of numbers at any such time.

According to another aspect, a safe card system comprising the safe cards, safe card readers and service provider computer system is provided.

Further features, embodiments and limitations may serve to increase the security of the cards/system and/or make them more particularly suitable for intended uses.

In some embodiments the card computer memories of the safe cards are ROM only, to protect the cards from tampering that might alter the stored data.

The numbers may be hardwired in the cards, Preferably, the processor and memory are part of a microcontroller.

The card output signals in some embodiments comprise a barcode and/or QR and at least a portion of the card reader sensors comprise barcode and/or QR readers, to allow the cards to be used at shops etc. In particular, the card output signal means on at least a portion of the safe cards with the barcode/QR generators exclude alphanumeric character displayers and USBs or other output means that might allow an unauthorized user to learn how to abuse the card, although the periodically changing third number renders unlawful successful use of the card exceedingly difficult if not impossible. The output means is for example a Bluetooth. The output signal is for example an SMS.

The excluded alphanumeric character displayers comprise digital display screens and printers. Such exclusion in principle renders the card even safer for use, however a user may prefer to see the numbers generated by the card, and perhaps copy the numbers or print them to review previous uses of the card.

The service provider computer system may periodically or upon request for the user provide reports of the credit card numbers of the card, in the form of a table containing use time and matching number, for example, and the user may compare the numbers in the report to numbers directly obtained from the card.

Some embodiment therefore have the card signal output means selected from a group comprising: at least one display screen, a printer, USB and combinations thereof.

In some embodiments of the safe cards:
 the card computer memory in at least a portion of the safe cards further comprises a lookup table of arrays each with a set of rearrangement parameters, each time of the clock being uniquely associated with a set of rearrangement parameters, and
 the preprogrammed instructions for the card microprocessor further comprise instructions to automatically rearrange the digits in the first number at the specific time according to the a set of rearrangement parameters associated with the specific time.

The rearrangement is another encryption step.

In some embodiments of the safe cards:
 the card computer memory further comprises a lookup table of arrays with operand parameters, time of the clock being uniquely associated with an operand parameters array, and
 the preprogrammed instructions for the card microprocessor further comprise instructions to automatically calculate the third number based on the operand parameters of an operand parameters array associated with the specific time.

The operands may be mathematical operations applied in sequence or in parallel to a single number or digit, for example the number 100 may be drawn as a second number, which is first squared to 10000 and then subtracted from 10000 to result in the number 9900 that can be output to a screen as is or in a further altered form, for example digits may be removed or added, to fill the screen cells together with digits of the first number.

The manipulation of the numbers may be performed by a low-level language such as Assembler, and may include shift and rotate operations.

The manipulation may further comprise rearrangement of the numbers before or after the application of the operands, again on the basis of arrays storing parameters for the rearrangement, each array tied to a particular time.

The biometric identifiers may be selected from a group comprising: voice, retina pattern, PIN number, fingerprint, handprint, facial features, and combinations thereof.

At least in a portion of the safe cards the card signal output means comprises a screen, the screen may comprise a series of display cells, each cell configured to display one digit of a decimal base of the third number, and wherein:
 the card computer memory further comprises a lookup table of arrays each with a set of rearrangement parameters, each time of the clock being uniquely associated with a set of rearrangement parameters, and
 the preprogrammed instructions for the card microprocessor further comprise instructions to:
  automatically remove digits from the second number in decimal base, at the specific time, according to a set of rearrangement parameters associated with the specific time;
  output digits remaining in the second number after the removal to display cells according to the position of the digits in the second number decimal base;

replace removed digits in the second number decimal base with digits of the first number,
wherein the third number is the second number decimal base with removed digits thereof replaced with the digits of the first number.

The user may see on such embodiments a changing number that also periodically has digits removed (leaving blank cells behind), which are filled with the digits of the first number representing biometric identifier of the user. A report of the credit card numbers generated by the card will list numbers that are all containing all of the digits representing the PIN of the user, however typically the digits will not be in proximity with each other but rather scattered in the third number, thereby rendering the PIN number harder to copy.

In some embodiments, in at least a portion of the safe cards:
the card computer memory further comprises a lookup table of arrays each with a set of operands, each time of the clock being uniquely associated with a set of operands, and
the preprogrammed instructions for the card microprocessor further comprise instructions to automatically calculate the second number from a number in the card table of numbers associated with the specific time, according to the set of rearrangement parameters associated with the specific time.

The operands are used to calculate a number based on the second number. As the second number, the operands are encoded when the card is manufactured, however the same operands may be used by all the cards at a given time, whereas the second number is unique to each card at any given time. Nevertheless, the calculation involving operations on the second number contributes to the encryption of the credit card number.

The cards may further comprise batteries operationally coupled to the processor. Other powering means may be used instead, such as movement-powered means.

The housing is selected from the housing of a credit card, a smart card, a cellular telephone, a computer (desktop, portable etc) and a PDA.

The safe card readers may each further comprise a GPS configured to assign a seventh number unique to the location of the safe card reader, and the input converter is configured to combine the seventh number with an eighth number assigned to the card reader input signal, to generate the fourth number. Thus, a credit card number may also contain a part identified with the card reader. Such identification may be used to help prevent use by thieves of a stolen card in an area outside the geographic range where the card may be used, for example, or to limit use of the card outside the shopping area where the card is used, for a certain period of time.

Alternatively, at least some of the safe cards each further comprise a GPS configured to assign a seventh number unique to the location of the safe card, and the card processor is configured to combine the first, second and seventh number, to generate the third number.

Some of the safe cards may further comprise communication means configured to allow the clock of the safe card and the clock of the service provider computer system to synchronize their times. Such synchronization may help reduce false mismatches of the credit card with the service provider due to time lags.

The invention claimed is:

1. A safe card comprising:
   at least one card sensor capable of generating at least one card input signal representing at least one biometric identifier;
   a card input converter configured to convert the at least one card input signal into a first number;
   a card microprocessor;
   a clock;
   at least one card computer memory comprising:
      a preprogrammed card lookup table of second numbers, wherein each of the second numbers is uniquely associated with a specific time of the clock;
      preprogrammed instructions for the card microprocessor to automatically generate, at a specific time of the clock, a third number comprising a combination of the first number and one of the second numbers associated with the specific time of the clock, and
      a card signal output means configured to convert the third number into at least one card output signal representing the third number, wherein the card output signal means exclude alphanumeric character displayers and USBs, wherein the safe card further comprises a GPS configured to assign a seventh number unique to the location of the safe card, and wherein the preprogrammed instructions further combine the first number, the second numbers and the seventh number, to generate the third number.

2. The safe card of claim 1, wherein said at least one card computer memory is ROM.

3. The safe card of claim 1, wherein the card output signal comprises a barcode and/or QR.

4. The safe card of claim 1, wherein the card signal output means is selected from the group consisting of at least one display screen, a printer, USB, and combinations thereof.

5. The safe card of claim 1, wherein
   said at least one card computer memory further comprises at least one lookup table of arrays, each array comprises a set of rearrangement parameters uniquely associated with a time of the clock, and wherein
   the preprogrammed instructions further comprise instructions to automatically rearrange the digits in the first number at the specific time according to a set of rearrangement parameters associated with the specific time.

6. The safe card of claim 1, wherein
   said at least one card computer memory further comprises a lookup table of arrays with operand parameters, each operand parameters array being uniquely associated with a time of the clock, and wherein the preprogrammed instructions further comprise instructions to automatically calculate the third number based on an operated number generated by operations on the second number with the operand parameters of an operand parameters array associated with the specific time.

7. The safe card of claim 6, wherein
   said at least one card computer memory further comprises a lookup table of arrays, each array comprises a set of rearrangement parameters uniquely associated with a time of the clock, and wherein
   the preprogrammed instructions further comprise instructions to automatically rearrange the digits in the operated number to a rearranged operated number at the specific time according to a set of rearrangement parameters associated with the specific time.

8. The safe card of claim 1, wherein the biometric identifier is selected from the group consisting of voice, retina pattern, PIN number, fingerprint, handprint, facial features, and combinations thereof.

9. The safe card of claim 1, further comprising a keypad.

10. The safe card of claim 1, wherein the card signal output means comprises a screen, and wherein the screen comprises a series of display cells, each cell configured to display one digit of a decimal base of the third number, and wherein:
- the card computer memory further comprises a lookup table of arrays, each array with a set of rearrangement parameters, uniquely associated with a time of the clock, and
- the preprogrammed instructions further comprise instructions to:
- automatically remove digits from the second number in decimal base, at the specific time, according to a set of rearrangement parameters associated with the specific time;
- output digits remaining in the second number after the removal to display cells according to the position of the digits in the second number decimal base;
- replace removed digits in the second number decimal base with digits of the first number,
- wherein the third number is the second number decimal base with removed digits thereof replaced with the digits of the first number.

11. The safe card of claim 6, wherein the card signal output means comprises a screen, and wherein the screen comprises a series of display cells, each cell configured to display one digit of a decimal base of the third number, and wherein:
- the card computer memory further comprises a lookup table of arrays, each array with a set of rearrangement parameters, uniquely associated with a time of the clock, and
- the preprogrammed instructions further comprise instructions to:
- automatically remove digits from the operated number;
- output digits remaining in the operated number after the removal to display cells according to the position of the digits in the operated number decimal base;
- replace removed digits in the operated number decimal base with digits of the first number,
- wherein the third number is the operated number decimal base with removed digits thereof replaced with the digits of the first number.

12. The safe card of claim 7, wherein the card signal output means comprises a screen, and wherein the screen comprises a series of display cells, each cell configured to display one digit of a decimal base of the third number, and wherein:
- the card computer memory further comprises a lookup table of arrays, each array with a set of rearrangement parameters, uniquely associated with a time of the clock, and
- the preprogrammed instructions further comprise instructions to:
- automatically remove digits from the rearranged operated number;
- output digits remaining in the rearranged operated number after the removal to display cells according to the position of the digits in the rearranged operated number decimal base;
- replace removed digits in the rearranged operated number decimal base with digits of the first number,
- wherein the third number is the rearranged operated number decimal base with removed digits thereof replaced with the digits of the first number.

13. The safe card of claim 1, further comprising batteries operationally coupled to the processor.

14. The safe card of claim 1, further comprising a PIN code in said at least one computer memory, wherein said PIN code represents one biometric identifier, and the card is configured to allow use thereof when the first number matches the PIN code.

15. A plurality of safe cards of claim 1, wherein the third number of each safe card at the specific time is different from the third number at said specific time of another safe card from said plurality of safe cards.

16. A safe card system comprising:
- a plurality of safe cards, wherein each safe card comprises:
- at least one card sensor capable of generating at least one card input signal representing at least one biometric identifier;
- a card input converter configured to convert the at least one card input signal into a first number;
- a card microprocessor;
- a first clock;
- at least one card computer memory comprising:
- a preprogrammed card lookup table of second numbers, wherein each of the second numbers is uniquely associated with a specific time of the first clock;
- preprogrammed instructions for the card microprocessor to automatically generate, at a specific time of the first clock, a third number comprising a combination of the first number and one of the second numbers associated with the specific time of the first clock;
- a card signal output configured to convert the third number into at least one card output signal representing the third number;
- at least one safe card reader comprising
- at least one card reader sensor capable of reading the card output signal;
- a card reader input converter configured to convert the at least one safe card reader input signal into a fourth number, a service provider computer comprising:
- a second clock;
- a service provider microprocessor;
- at least one service provider computer memory comprising:
- preprogrammed service provider lookup tables of fifth numbers, wherein each fifth number in the service provider tables is associated with a time of the second clock;
- preprogrammed instructions for the service provider microprocessor capable of automatically generating at the specific time at least one sixth number derived from the fifth numbers associated with the specific time, and comparing the sixth numbers to the fourth numbers so as to allow service to the safe card generating the third number when a sixth number is identical to the fourth number, wherein each of said at least one safe card readers further comprises a GPS configured to assign a seventh number unique to a location of the safe card reader, and wherein the input converter is configured to combine the seventh number with an eighth number assigned to the card reader input signal, so as to generate the fourth number.

17. The safe card system of claim 16, wherein said at least one card reader sensor is a barcode or QR reader.

18. The safe card of claim 16, further comprising communication means configured to allow the first clock and the second clock to synchronize their times.

* * * * *